INVENTORS.
STEPHEN N. ANDRE,
RONALD D. HETTICH,
LELAND R. MEGARGEL
and CARL J. STENGEL, JR.

ATTORNEY.

INVENTORS.
STEPHEN N. ANDRE,
RONALD D. HETTICH,
LELAND R. MEGARGEL
and CARL J. STENGEL, JR.

BY *Stanley M. Schurger*

ATTORNEY.

INVENTORS.
STEPHEN N. ANDRE,
RONALD D. HETTICH,
LELAND R. MEGARGEL
and CARL J. STENGEL, JR BY [signature]
ATTORNEY.

FIG. 19

United States Patent Office 3,434,142
Patented Mar. 18, 1969

3,434,142
ELECTRONICALLY CONTROLLED AZIMUTH
SCANNING ANTENNA SYSTEM
Stephen N. Andre, Tonawanda, Ronald D. Hettich,
Depew, and Leland R. Magargel and Carl J.
Stengel, Jr., Buffalo, N.Y., assignors to Sylvania
Electric Products Inc., a corporation of Delaware
Filed Dec. 30, 1966, Ser. No. 606,181
U.S. Cl. 343—100				19 Claims
Int. Cl. H04b 7/00, 7/10

ABSTRACT OF THE DISCLOSURE

An electronically despun antenna system for a spin stabilized communication satellite comprising a flared biconical horn inwardly terminated by a parallel plate region which is excited by a ring of cophasally fed probes. A polarizer comprising a set of gratings on a dielectric sheet is disposed about the periphery of the horn to provide circular polarization. The probes are energized by a transmitter coupled through a plurality of controllable phase shifters, each comprising a Faraday rotator, quarter wave plate and dual mode transducer for coupling conjugated phased outputs to a pair of diametrically opposite probes from a single input. The phase shifters are controlled by a set of mutually phase offset periodic waveform signals generated from a beam control circuit in response to a source of reference pulses, such as earth center pulses derived from an infrared horizon sensor. The beam control circuit comprises a sinewave synthesizer, controlled in timing by a phase lock loop responsive to the reference pulses, and a phase synthesizer for producing a plurality of phase shifted versions of the synthesized sinewave. In the event of a failure in the beam controlled or reference pulse circuitry, a failure detection circuit generates a signal operative to switch the transmitter output power from the ring of probes to a center probe, thereby providing a toroidal omnidirectional antenna pattern.

---

This invention relates to antenna systems and, more particularly, to a 360° azimuth scanning antenna and an electronic control system associated therewith. It is concerned principally, but in its broader aspects not exclusively, with an electronically despun antenna system for a spin stabilized communication satellite, i.e. a satellite-mounted system for producing a directive antenna beam and electronically rotating that beam in a direction opposite to the spin of the satellite, at the same angular velocity, so as to continually point the beam in a fixed direction.

In the search to provide more and improved radio links for beyond-line-of-sight communications, earth orbiting communication satellites have been employed as microwave repeater stations for relaying radio signals between two earth stations located within the area of the earth's surface illuminated by the satellite antenna beam. If such satellites are not controlled in orbit, they tend to tumble at random, thereby requiring an omnidirectional antenna to assure constant earth coverage. An isotropic radiation pattern, however, is much too inefficient for such applications; hence, it is desirable that the satellite antenna be highly directive, a factor that requires precise automatic orientation of the satellite vehicle or its antenna in order to maintain the radiation pattern constantly directed toward earth. A currently favored means of providing the requisite orientation and attitude stabilization is to launch the satellite in a manner to impart a residual spin, and then use reaction jet torque impulses to precess the satellite spin axis so that it is oriented normal to the orbital plane.

Spin stabilized satellites initially employed an azimuthally omnidirectional antenna to provide a uniform circular field pattern about the spin axis, and which was narrow in the elevation plane, the azimuth plane being parallel to the orbital plane. Some portion of this pancake shaped antenna pattern is always directed toward the earth as the satellite spins on its axis; however, this radiation pattern is also inefficient in that a major segment of the radiated energy is directed away from the earth.

Optimum transmission efficiency can be obtained by pointing a pencil-like directional beam towards the earth with a beamwidth just wide enough to illuminate the desired portion of the earth's surface. Such an antenna approach has been found to yield approximately an order of magnitude increase in gain over the azimuthally omnidirectional antenna. In order to provide a pencil-like antenna field pattern in a fixed direction from the spinning satellite, the antenna beam must rotate counter to the spin of the satellite and at the same angular velocity. This function of despinning the antenna beam may be accomplished either mechanically or electronically. Mechanically despun antennas are realized in one of two basic forms. The first of these typically involves aligning a circularly symmetric feed horn along the spin axis of the satellite so that it illuminates an offset reflector which is contra-rotated with respect to and at the spin rate of the satellite. The second basic approach employs a microwave rotary joint which permits the entire radiating structure to be contrarotated with respect to the satellite body.

A known electronically despun antenna system comprises a stacked array of antenna elements arranged in a circularly symmetric manner about the spin axis of the satellite with the disposition and phase excitation of the elements being designed to provide a narrow beam field pattern in a direction perpendicular to the spin axis. The excitation phase of the elements is modulated or varied to cause the beam to rotate counter to the spin of the satellite and at the same angular velocity. The shape of the antenna pattern in the elevation plane is determined by the number and spacing of antenna elements which are arrayed in the elevation plane. Because of the large number of elements in this stacked array, it is extremely cumbersome to feed each element with the requisite signal by reason of the multiplicity of signal paths and the geometry into which these paths must be arranged.

The complexity of the prior art systems is further complicated by the conventional phase shifters used to control each antenna element. These devices, of either coaxial or waveguide construction, provide only one output and, if of the reciprocal ferrite type, must be biased in order to obtain phase angles of both senses. Non-reciprocal devices that do not require bias have been made in rectangular waveguide, but they also provide only one output. A ferrite version of the "Fox" half wave plate mechanically operated phase shifter has been described in the literature, but this device requires a magnetic structure similar to a four-pole two-phase AC motor. The RF phase angle produced by the shifter corresponds in magnitude and sense to the angle through which the transverse magnetic field of the motor type field structure is rotated by the relative amplitudes and phase separation of the two control voltages, and the RF phase angle is not a simple function of control voltage amplitude.

The synchronizing circuit for controlling the phase shifters, in the above described electronically despun system, includes a rather complex arrangement of time delay networks and clockwork mechanisms, components which detract from system reliability. Further, there is no means provided for obtaining an omnidirectional mode of operation in the event of a failure in the synchronizing system.

In accordance with the present invention, a relatively simple and efficient directional antenna system is provided which can be judiciously switched to an omnidirectional radiation mode in the event of control circuitry failure. A radiating structure is employed which comprises a flared biconical horn inwardly terminated by a parallel plate region which, in turn, is excited by a ring of cophasally fed probes. The field within the flared horn and parallel plate section is linearly polarized, with the E-vector being parallel to the probes. For communication systems requiring circular polarization, a light-weight, circularly polarizing set of gratings is placed around the periphery of the flared horn section.

The shape of the radiated antenna beam in the azimuth plane is determined by the number, configuration and energization of the probes, and the shape of the beam in the elevation plane is determined by the flare angle and aperture width of the mouth of the flared horn. Hence, control of the beam shape in two planes is achieved without the necessity of stacking individual radiators, as is conventionally done. In the embodiment described hereinafter, beamwidth in the azimuth plane is inversely proportional to the diameter of the ring of probes, and elevation beam-width is inversely dependent on the elevation spacing between the outer edges of the flared horn.

As in the prior art case, the probes are energized by a transmitter coupled through a plurality of controllable phase shifters. In this instance, however, the number of phase shifters is reduced by one-half since each phase shifter couples energy to a pair of diametrically opposite probes. This improvement is achieved by use of a unique electrically controllable phase shifter comprising a Faraday rotator, a quarter wave plate and a dual mode transducer combined to produce two equal amplitude, conjugately phased outputs from a single input. This phase shifter requires a relatively small amount of control power, and the phase of each output is a linear function of the control signal voltage applied to the rotator.

The source of control signals for the phase shifters is a beam control circuit comprising a source of reference pulses and means responsive to the reference pulses for producing a plurality of phase offset periodic waveforms. The periodic waveform signals are applied to respective phase shifters to control the phase shift of the energy flowing through them. In this manner, the energization of the probes is controlled to position the antenna beam with a 360° azimuth scanning capability. In the embodiment described hereinafter, the means for producing a plurality of periodic waveforms comprises: a phase lock loop responsive to the reference pulses for generating timing signals synchronized in phase and frequency with the reference pulses; a sinewave synthesizer controlled by the phase lock loop timing signals; and a phase synthesizer for producing a plurality of phase shifted versions of the synthesized sine wave.

The above outlined radiating structure and associated electronic control system is designed to form and steer a pencil-like, directional antenna beam. If a fail safe mode of operation were not provided, a failure in the control system would render the antenna completely useless. The present invention provides for such a contingency by including means for switching to a toroidal omnidirectional antenna pattern in response to failure of the control system. According to one implementation, the means for providing an omnidirectional fail-safe mode of operation comprises a failure detection circuit for generating a failure signal in response to an error in the reference pulses or in the control signals applied to the phase shifters, and a switch responsive to that failure signal for switching the transmitter output power from the ring of probes to a center probe. An alternate technique is to decouple the control signals from the phase shifters and thereby demagnetize them in response to the failure signal. With demagnetization of the phase shifters, the transmitter output power applied to the probes is un-shifted in phase, thereby providing in-phase energization of said probes and causing a toroidal omnidirectional pattern to be generated from the horn.

For application wherein the aforementioned radiating structure and associated electronic control system are mounted on a body adapted to spin about an axis, and despinning of the radiated pencil beam with respect to the spinning body is required, the source of reference pulses for the beam control circuit includes means for detecting a selected reference object in space and means for generating a pulse corresponding to that reference object. More specifically, in an electronically despun antenna system for a spin stabilized communication satellite, the reference pulses are provided by using an infrared sensor to detect the presence of the earth, and a logic circuit derives a narrow earth center pulse from the sensor output signal and discriminates against unwanted signals due to the sun, moon, or noise. The earth center pulse identifies the local vertical to the earth, and a series of these pulses is generated when the satellite is spinning. The beam control circuit is then operative in response to the earth center pulses to generate a set of periodic waveforms having a frequency equal to the spin rate of the satellite and phased so as to adjust the phase shifters to control the energization of the probes to form a directional pencil beam which is phase locked to the earth's position. In this manner, the radiated pencil beam is always pointed toward the earth as the satellite spins about its axis.

Other objects, features and advantages of the invention will become apparent and its construction and operation better understood, from the following detailed description taken in conjunction with the accompanying drawings, in which:

FIG. 13 is a cross-sectional view taken along line

13—13 of FIG. 10 which illustrates the manner in which a ferrimagnetic rod is supported within the phase shifter;

Figure 1:
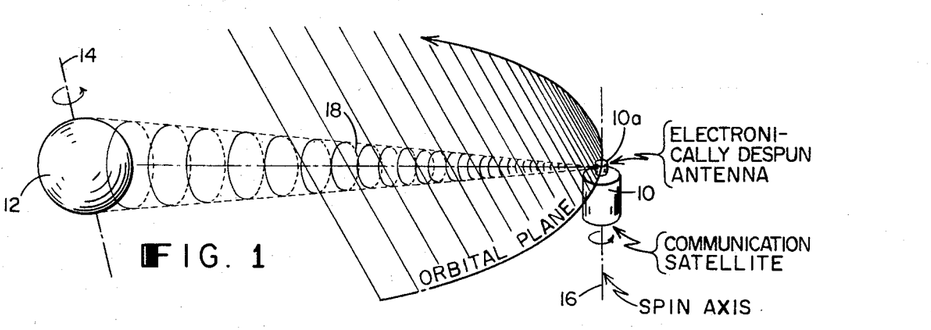
FIG. 1 is a perspective view illustrating the geometry of a spin stabilized communication satellite in orbit about the earth and picturing a directional pencil beam radiating from the satellite antenna.

Referring now to the drawings, a particularly useful application of the invention is illustrated in FIG. 1, which shows the geometry of a spin stabilized communication satellite 10 in synchronous equatorial orbit about the earth 12. The orbital plane of satellite 10 passes through the equator of the earth, and the satellite travels in the same direction and at the same angular velocity as the earth's rotation about its axis 14. In this manner, satellite 10 remains stationary over a single geographic point on the earth. To provide attitude stabilization, satellite 10 also spins about an axis 16 as it orbits the earth. The satellite spin axis 16 is aligned normal to the orbital plane, and, therefore, is parallel to the earth's rotational axis 14.

In this case, the present invention may be advantageously employed on satellite 10 as an electronically despun antenna system for constantly directly a radio beam toward earth. In FIG. 1, the radiating structure of this antenna is illustrated as portion 10a of the satellite. A directional pencil beam 18 is shown radiating from the despun antenna 10a to illuminate an area of the surface of the earth 12. FIG. 1, of course is solely representational and not to scale, the relative size of the satellite 10 to that of the earth 12 and the distances therebetween being disproportionate for clarity of illustration. For this synchronous orbit case, the satellite is at an altitude of approximately 22,300 miles above the earth, at which the earth's subtense is 17.3°. Thus, in order to provide earth coverage from a satellite at synchronous altitude, the beamwidth of the antenna would have to be 17.3° plus an amount to allow for satellite stabilization and antenna tracking errors.

Figure 2:
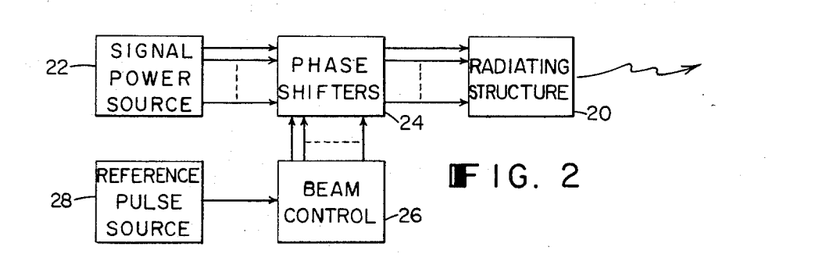
FIG. 2 is a block diagram of the basic elements of an antenna system in accordance with the present invention.

The basic elements of the antenna system comprising the present invention are shown in the block diagram of FIG. 2. Radiating structure 20 is energized by a signal power source 22 which is coupled to the radiating structure through a plurality of controllable phase shifters, denoted as block 24. The phase shifters are controlled by a set of mutually phase offset periodic waveform signals generated from a beam control circuit 26 in response to a source of reference pulses 28.

Figure 3:
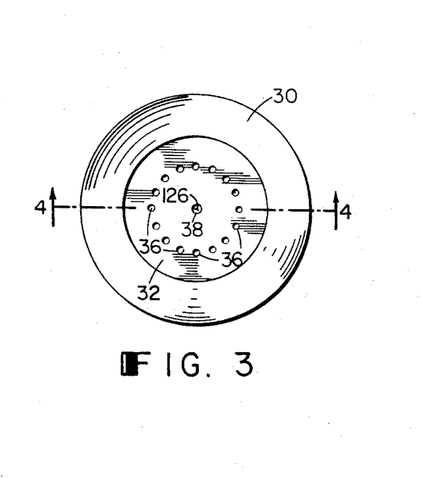
FIG. 3 is a top plan view of the radiating structure in accordance with the present invention.

The particular embodiment of the invention now to be described relates to an antenna system for operating at X-band frequencies. Consequently, the signal power source 22, phase shifters 24, and radiating structure 20 are comprised of microwave circuit components. The radiating structure is illustrated in FIG. 3, which shows a top plan view, and FIG. 4, which shows a central sectional view. The components of the radiating antenna include a flared biconical horn 30, a pair of circular parallel plates 32 and 34 inwardly terminating horn 30 and providing a radial transmission line feed for the horn, and a circularly symmetric ring of 16 microwave probes disposed between parallel plates 32 and 34. All of the probes 36 are coupled through phase shifters 24 to the signal power source 22. Upon being energized by the power source, the probes excite a mode of electromagnetic wave energy between the parallel plates, and this radial transmission line feeds the biconical horn to radiate an antenna pattern. The spacing between the two parallel plates 32 and 34 of the radial line is selected to be approximately ⅓ of a wavelength of the transmitting frequency so as to support only the fundamental TEM mode radiating from a single probe. The combination of the modes from the various probes form other modes in the parallel plate region which, in turn, give the desired modal pattern to shape the antenna beam.

For purposes of describing the dimensions of the radiated antenna beam, the plane normal to the axis 38 of the biconical horn 30 is the azimuth plane; for the communication satellite application, this azimuth plane is parallel to the orbital plane and is the plane in which the antenna beam is despun. The elevation plane is normal to the azimuth plane and is the plane in which the horn axis 38 lies. The shape of the radiated beam in the azimuth plane is determined by the number, configuration and energization of the probes 36. The shape of the beam in the elevation plane is determined by the flare angle A and the aperture width B of biconical horn 30. For an embodiment of this radiating structure constructed as part of a despun antenna system for a synchronous orbit, spin stabilized communication satellite, a flare angle A of 41° and an aperture spacing B of approximately 2½ to 3 times the wavelength of the transmitting frequency were selected to obtain a 28° beamwidth in the elevation plane, and 16 probes were uniformly spaced around the periphery of a circle having a diameter of about 1.8 wavelengths so as to provide a 22° beamwidth in the azimuth plane when energized as described hereinafter. Further, the spacing between probes was selected to be sufficiently close, less than 0.4 wavelength, to minimize spin ripple; too great a spacing yields an undesirable variation in antenna gain or gain ripple as the beam rotates. In this application, the beamwidth of the antenna in the elevation plane was observed to be inversely dependent on the aperture width B of the mouth of the biconical horn, and the beamwidth in the azimuth plane inversely proportional to the diameter of the ring of probes 36. By means of the antenna radiating structure shown in FIGS. 3 and 4, therefore, shaping of the antenna beam in two dimensions is accomplished without stacking individual radiators. This advance cover the prior art provides a relatively simple means of obtaining a narrow beamwidth in the elevation plane, and the feed problem is considerably simplified because of the relatively small number of microwave probes.

Figure 4:
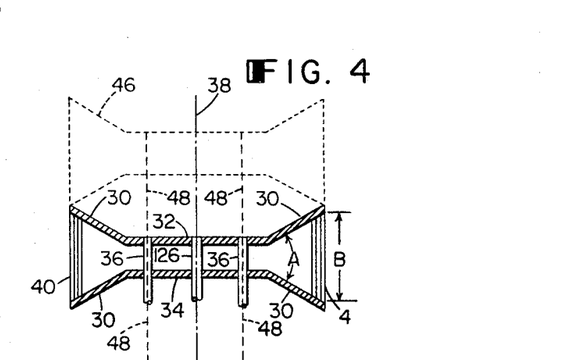
FIG. 4 is a cross-sectional view taken along line 4—4 of FIG. 3.
Figure 5:
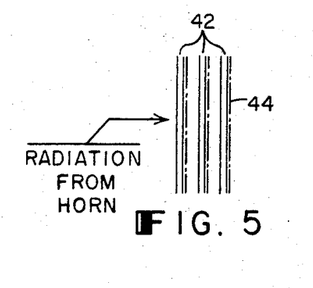
FIG. 5 is a cross-sectional view of a polarizer useful in the radiating structure shown in FIGS. 3 and 4.
Figure 6:
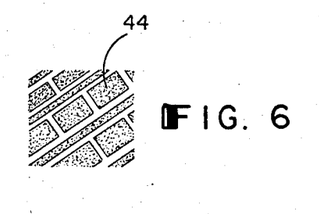
FIG. 6 is a plan view of a portion of the polarizer of FIG. 5 illustrating the pattern of the elements thereon.

Upon excitation of the microwave probes 36, the polarization of the electromagnetic fields within the radial transmission line is linear, with the E-vector directed parallel to the probes and perpendicular to parallel plates 32, 34. This linearly polarized wave energy radiates into the biconical horn region. For communication systems requiring the transmission of circular polarization, a light weight polarizer of the anisotropic dielectric type is disposed around the periphery of the flared horn section for converting the wave energy in the horn into circular polarization. There are a variety of techniques for designing the requisite polarizer; however, a particularly suitable design comprises the use of a circularly polarizing set of gratings etched on a dielectric sheet, such as described by D. S. Lerner in the January 1965 IEEE Transactions on Antennas and Propagation, pp. 3 through 7. These gratings act as shunt susceptances for transforming the linearly polarized wave to circular polarization. For adaptation to the circular periphery of the biconical horn, three concentric cylindrical gratings are used to surround the feed elements of the antenna. This design for polarizer 40 is illustrated in simplified form in FIG. 4 and in more detail in FIGS. 5 and 6. The cross-sectional view of FIG. 5 shows the three dielectric sheets 42 on which a pattern of metallic elements 44 is deposited or adhered. The normal method of fabrication is to etch the pattern out of copper cladding on a sheet of plastic material. The copper pattern is typically of the order of 0.001" thick, and the plastic sheet on the order of 1/32" thick. A typical pattern of the metallic elements is illustrated in FIG. 6. These elements, when spaced apart by about 0.176 wavelength, also provide the necessary impedance match for the wave energy between the horn and free space.

The radiating structure just described is a transmitting antenna. In order to provide both receiving and transmitting horns, a second radiating structure, illustrated by dashed outline as receiving antenna 46 in FIG. 4, is juxtaposed with the transmitting antenna along the common horn axis 38. The structural details of receiving antenna 46 are similar to those described for the transmitting antenna, except that, for the case where the transmitted energy is left hand circularly polarized and the received energy is right hand circularly polarized, the receiving antenna polarizer would be designed to convert the right hand circularly polarized wave to a linearly polarized wave having an electric vector perpendicular to the parallel plates, i.e., parallel to the probes. The feed to the receiving antenna can be provided by any of a number of methods. A preferred approach would be to use tri-axial cable, whereby the transmitting antenna probes 36 would in effect have a hollow cylindrical shape, and the receiving antenna probes would be coupled to the input of the receiver (not shown) by means of a miniature coaxial cable 48 passing through the interiors of the transmitting probes. As will be described hereinafter with respect to a transponder, the receiving system would employ a different set of phase shifters for controlling the energy coupled between the receiving antenna and the receiver, but the beam control circuit 26 and reference pulse source 28 could be common to both the receiving and transmitting systems.

Figure 7:
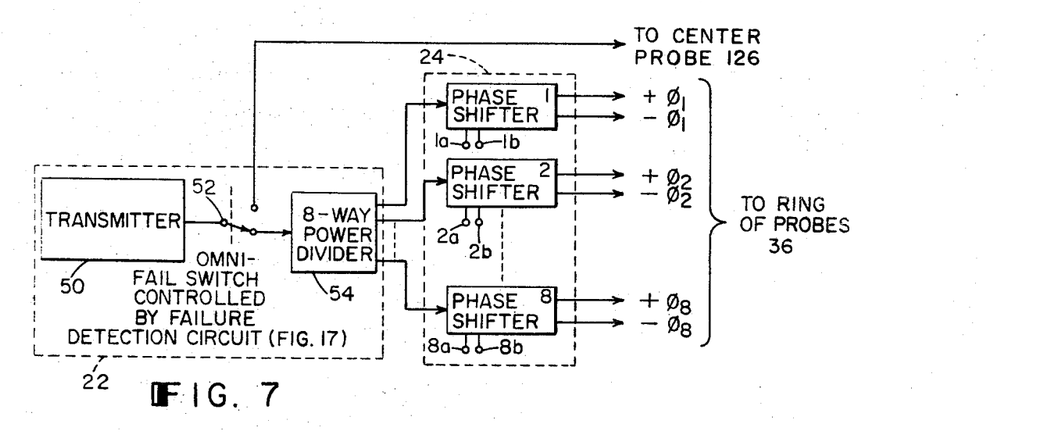
FIG. 7 is a block diagram of the transmitter and its coupling network for energizing the radiating structure of FIGS. 3 and 4 in accordance with the present invention.

A preferred embodiment of the coupling network between the signal power source and microwave probes 36 of the transmitting antenna is shown by the block diagram of FIG. 7. Power source 22 includes a transmitter 50 having power output means comprising an omnidirectional-fail switch 52 and an 8-way power divider 54. The omnidirectional-fail switch normally connects the primary output terminal of transmitter 50 to the input of power divider 54, and, in the event of a failure, switches the output power away from the power divider in a manner to be discussed hereinafter. The plurality of phase shifters comprises eight controllable phase shifters, denoted 1 thru 8 in FIG. 7. Each phase shifter is unique in that it has a single input, coupled to one of the outputs of the power divider 54, and two conjugately phased outputs which are respectively coupled to a diametrically opposite pair of the probes 36. The conjugated phased outputs of phase shifters 1 thru 8 are denoted $+\phi1$, $-\phi1$ thru $+\phi8$, $-\phi8$, respectively. Hence, the output power of transmitter 50 is divided into eight outputs which are respectively applied to phase shifters 1 thru 8 of block 24, and the sixteen phase shifter outputs $+\phi1$, $-\phi1$, thru $+\phi8$, $-\phi8$ are connected to the sixteen radial line probes of the transmitting antenna.

Each of the phase shifters 1 thru 8 also has a pair of control terminals, denoted respectively as 1a, 1b thru 8a, 8b, across which one of the control signals from beam control circuit 26 is applied. In the preferred embodiment of the invention being described, the control signals comprise eight sine waves having respective phase offsets of 0°, 22.5°, 45°, 67.5°, 90°, 112.5°, 135°, and 157.5°. Hence, the transmitter output phase shift introduced by each phase shifter is varied in a sinusoidal manner over a selected phase shift range, e.g., +360° to −360°, but at the instant $+\phi1$ is 0°, $+\phi2$ is 22.5° and $+\phi3$ is 45°, etc. Further, as mentioned above, each phase shifter provides two conjugately phased outputs. Thus, for example, if the instantaneous amplitude of the control signal applied to phase shifter 5 is operative to produce a 90° phase shift in the transmitter output signal, phase shifter 5 provides not only the +90° phase shifted output, but it also generates the conjugate phase output of −90°. In this manner, referring to FIG. 3, the ring of sixteen probes 36 is simultaneously energized with a clockwise phase sequence, from a given zero reference at a given instant, of 0°, 22.5°, 45°, 67.5°, 90°, 112.5°, 135°, 157.5°, 0°, −22.5°, −45°, −67.5°, −90°, −112.5°, −135°, and −157.5°. This method of exciting the ring of microwave probes is called cophasal excitation and results in all probes being driven with a relative phase such that they all radiate in phase in a specific direction. Hence, this phase pattern of energization provides the desired high-gain pencil beam, while the sinusoidal modulation of phase causes rotation of the beam.

As for the details of construction, the interconnecting lines in FIG. 7 may be either waveguide or, preferably, coaxial cable. The omnidirectional-fail switch 52 can be a conventional microwave switch adapted to be controlled by an electrical signal. The 8-way power divider 54 may be a unitary device or made up of several microwave bridge networks known as hybrid circuits. In a preferred embodiment, the power divider comprises seven 3 db strip transmission line hybrids connected to provide isolation between the output ports. The block 24 phase shifters comprise another unique feature of the invention, and therefore, will be described in further detail.

Briefly, each of these phase shifters employs the Faraday rotation phenomena in conjunction with a 90° differential phase shift section and a dual mode transducer to produce two equal amplitude radio frequency outputs from a single input. The phase angles of the outputs are equal in magnitude and opposite in sign. This dual output phase shifter is the subject of a copending application Ser. No. 606,314, filed Dec. 30, 1966, and assigned to the assignee of the present application.

Figure 8:
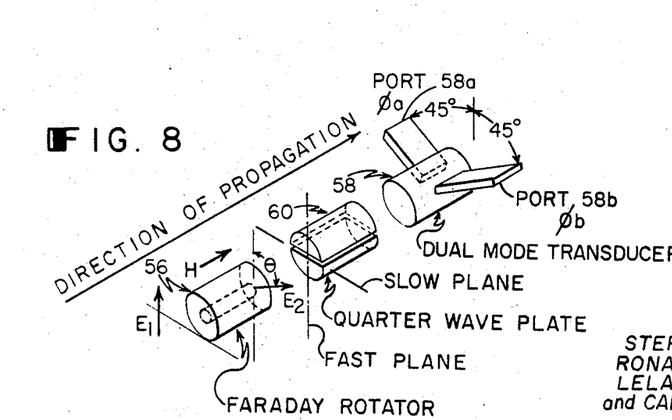
FIG. 8 is a schematic representation of a phase shifter useful in the antenna system of the present invention.

Referring to the schematic representation shown in FIG. 8, each of the block 24 phase shifters is a waveguide assembly comprising a Faraday rotator 56, a dual mode transducer 58 having a pair of outputs ports 58a and 58b, and a quarter wave plate 60 having fast and slow planes of propagation. In FIG. 8, the fast plane is indicated as lying in a vertical plane cutting longitudinally through the center of the waveguide, while the slow plane lies in a horizontal plane cutting longitudinally through the center of the waveguide.

The incident wave at the input to the Faraday rotator is plane polarized as indicated by the electric field vector $E_1$. The Faraday rotator 56 is responsive to application of an axial static magnetic field of intensity H to produce a rotation of the plane of polarization through an angle $\theta$, the rotated electric field vector being denoted as $E_2$. This rotational effect changes the angle of polarization with respect to the fast and slow planes of the quarter wave plate 60. A wave passing through the quarter wave plate polarized in the slow plane is delayed ninety electrical degrees with respect to a wave of identical phase and frequency entering the plate polarized in the fast plane. In the present application, sine wave control signals from beam control circuit 26 (FIG. 2) are applied to the phase shifter to control the magnetization of the Faraday rotator. Hence, a plane polarized wave of variable polarization angle $\theta$ is impinging upon the quarter wave plate. The dual mode transducer 58 following the quarter wave plate 60 is oriented so as to extract separately the two orthogonal polarizations which are inclined ±45° to the fast plane of the quarter wave plate.

Figure 9:
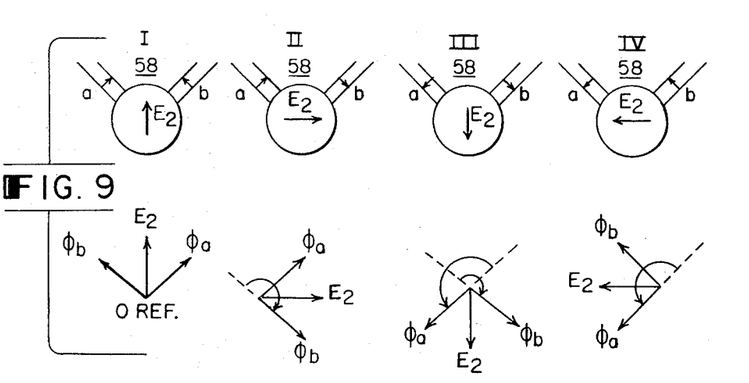
FIG. 9 is a combined schematic and vector diagram for illustrating four conditions of operation of the phase shifter shown in FIG. 8.

The operation of the phase shifter will now be analyzed with reference to FIG. 9, which illustrates four conditions of polarization of the wave impinging upon the quarter wave plate 60, denoted as I, II, III, and IV. Each polarization condition is illustrated by a schematic axial view of the phase shifter waveguide looking in the direction of progapation, with arrows indicating the electric field vectors. Below each schematic is a corresponding vector diagram to further clarify the relative positions of the $E_2$ field vector impinging on the quarter wave plate, the electric field vector in port 58a, the output of which has a phase denoted as $\phi a$, and the electric field vector in output port 58b, which has an output phase denoted as $\phi b$.

If the output of rotator 56 is polarized to lie in the fast plane of quarter wave plate 60, as in condition I, all the energy passes through the quarter wave plate with a minimum delay and divides equally between the two outputs. Consequently, the two output phases $\phi a$ and $\phi b$ are equal.

If the rotator output polarization is rotated 90° clockwise so as to lie in the slow plane of the quarter wave plate, as illustrated by condition II, all energy transmitted by the quarter wave plate is delayed 90° with respect to the zero reference condition I. Again the output of the quarter wave plate divides equally between the two output ports. The component in port 58a is directed in the same spacial direction, but has been retarded 90° by the quarter wave plate so that $\phi a$ now equals $-90°$. The component in port 58b is oppositely directed in the spacial sense so that it can be considered to have been advanced in phase 180°; however, since this component has also been retarded 90° by the quarter wave plate, $\phi b$ equals $+90°$. An additional 90° rotation of the rotator output, as shown in condition III, is identical to the starting condition I except that both output vectors are reversed; hence, $\phi a$ equals $-180°$ and $\phi b$ equals $+180°$.

Finally, referring to condition IV, a 270° rotation of the $E_2$ vector is identical to condition II except that both output vectors are reversed. In this case the output phases are $-270°$ for $\phi a$ and $+270°$ for $\phi b$.

For the continuous variations of the rotator output polarization between the four specific cases illustrated above, it may be stated that, in general, each output is composed of an undelayed and a 90° delayed component. The undelayed E field component of the output of the quarter wave plate is $E_1 \cos \theta$, and the 90° delayed component is $E_1 \sin \theta$, where $E_1$ is the field strength of the $E_1$ vector. The total E field in port 58a is $$\sqrt{\frac{E_1^2 \sin^2 \theta + E_1^2 \cos^2 \theta}{2}} \text{ at angle } \theta a =$$

$$\tan^{-1}\left(\frac{-\sin \theta}{\cos \theta}\right) = -\theta$$

The E field in port 58b is $$\sqrt{\frac{E_1^2 \sin^2 \theta + E_1^2 \cos^2 \theta}{2}} \text{ at angle } \theta b = \tan^{-1}\left(\frac{\sin \theta}{\cos \theta}\right) = \theta$$

The amplitudes in terms of power are proportional to $$E^2 = \frac{E_1^2 (\sin^2 \theta + \cos^2 \theta)}{2} = \frac{E_1^2}{2}$$

Hence, the power is divided equally between the two outputs 58a and 58b, and each phase angle is the conjugate of the other; i.e. the phase angles are negatives of each other, but each phase angle has an absolute magnitude equal to the angle through which the plane of polarization is turned by the Faraday rotator 56.

In its simplest form, the Faraday rotator 56 consists of a square or circular waveguide having a long slender ferrite rod positioned on the axis of the guide. A solenoid produces the axial magnetic field. The direction in which the plane of polarization of a plane polarized wave is turned depends upon the direction (sense) of the control field and the direction in which the wave is propagating. A wave that is turned clockwise when viewed in the direction of propagation while propagating from left to right will be turned counterclockwise when viewed in the direction of propagation when propagating from right to left. Therefore, a wave which is rotated $\theta$ degrees in going from left to right, if deflected, will undergo a total rotation of $2\theta$ when it returns to the input.

The amount of Faraday rotation obtainable per unit length of the rod is dependent upon the magnetization produced in the ferrite, the amount of ferrite present and the energy distribution inside the ferrite loaded guide. This magnetization depends upon the applied field strength, the ferrite composition, and the ferrite geometry. The energy distribution is dependent upon the ferrite and guide geometries, the dielectric constant of the ferrite and the medium surrounding it, the percentage of the guide cross section occupied by the ferrite, and the frequency of the electromagnetic wave energy. Although the rod to be magnetized in the rotator has been described as being composed of ferrite material, any other material demonstrating ferrimagnetic properties may be employed, such as garnet.

Figure 11:
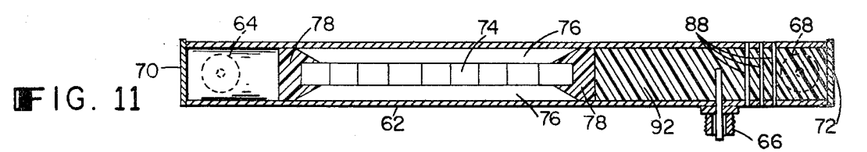
FIG. 11 is a cross-sectional view taken along line 11—11 of FIG. 10 which illustrates the interior structure of the phase shifter.
Figure 12:
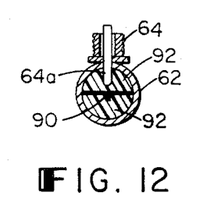
FIG. 12 is a cross-sectional view taken along line 12—12 of FIG. 10 which illustrates the input structure of the phase shifter.
Figure 13:
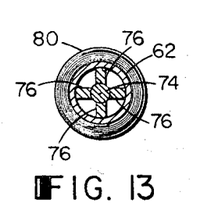

A preferred embodiment of the above described phase shifter intended for operation at X-band is illustrated in the various diagrammatic views of FIGS. 10 thru 14. In this particular design, the Faraday rotator, quarter wave plate and dual mode transducer are assembled in a circular waveguide 62 having an input port 64 and a pair of orthogonally disposed output ports 66 and 68. Each of the ports 64–68 is a coaxial connector having a microwave probe protruding into the circular waveguide; the probes are respectively denoted as 64a, 66a, and 68a. Waveguide 62 is a tubular conductor, such as silver coated copper, having an inside diameter of about 0.7″ and a length of about 12.5″. Circular plates 70 and 72 are securely brazed or soldered to the ends of the tubular waveguide. The Faraday rotator comprises a 5½″ long ferrimagnetic rod 74 supported along the axis of circular waveguide 62 by conductive vanes 76 and dielectric end plugs 78. The rotator further includes a solenoid coil 80 wound around the outside of the waveguide 62 so as to produce an axial magnetic field within the rod 74 when the solenoid is electrically energized. Wire ends 80a and 80b represent the terminals through which the sine wave control signals from beam control circuit 26 (FIG. 2) are applied to energize solenoid 80 so as to magnetize the phase shifter; wire ends 80a and 80b, therefore, correspond to one of the sets of phase shifter control terminals 1a and 1b thru 8a and 8b shown in FIG. 7. To provide the desired performance, ferrimagnetic rod 74 is a segmented construction made up of eleven garnet cylinders cemented together, each cylinder being ½″ long and ¼″ in diameter. Four conductive vanes 76 are symmetrically arranged as shown in FIG. 13 to support rod 74 along the central axis of the waveguide, each of the vanes being soldered or otherwise secured to the walls of the waveguide cylinder to ensure a good electrical connection thereto. The dielectric end plugs 78, which also provide support for the ferrimagnetic rod 74, are recessed to receive respective ends of the rod, and the outside diameter of each plug is tapered toward this recess opening.

The quarter wave plate in this instance is a lumped susceptance type comprising three pairs of diametrically opposed screws or rivets protruding into the circular waveguide at a 45° angle with respect to output probes 66a and 68a; the pairs of screws are denoted as 82a and b, 84a and b, and 86a and b, with 82b and 86b not being shown in any of the drawings. The slow plane of the quarter wave plate is the plane cutting through the protrusions in the waveguide; i.e. the plane normal to the plane of FIG. 14 which intersects that plane along line S. The fast plane is normal to the slow plane and clears the protrusions; i.e. the fast plane is normal to FIG. 14 along intersection line F.

Figure 10:
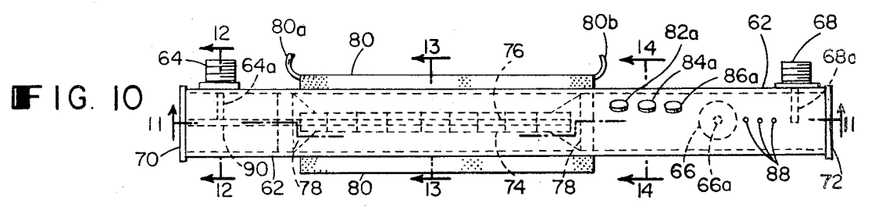
FIG. 10 is a plan view of a preferred embodiment of the phase shifter of FIG. 8.
Figure 14:
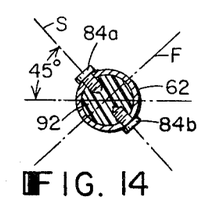
FIG. 14 is a cross-sectional view taken along line 14—14 of FIG. 10 which illustrates the structure of a quater wave plate forming a part of the phase shifter.

In FIG. 8, the dual mode transducer is schematically illustrated as having orthogonally related waveguide junctions providing output ports 58a and 58b. In FIG. 10, an alternate embodiment is shown wherein the dual mode transducer comprises orthogonally oriented probes 66a and 68a in the circular waveguide 62. Referring to FIGS. 10, 11 and 14, it will be noted that probes 66a and 68a are oriented at 45° on either side of the fast plane of the quarter wave plate, the orientation of the fast plane being denoted by intersection line F. In addition, probe 68*a* is displaced along the longitudinal axis of the waveguide from probe 66*a* so as to provide decoupling; during experimentation it had been determined that with the orthogonal probes located in the same plane, coupling between the adjacent probes was caused by $TM_{0,1}$ standing waves existing in the region near the probes. Further, a series of three transverse wires 88 are located between the coaxial probes and parallel to probe 66*a* to function as a quarter wave short to the $TE_{1,1}$ component having the polarization to which probe 66*a* is receptive, while exerting virtually no affect upon the perpendicularly polarized component.

Referring to FIGS. 10 and 12, a resistive card 90 is located axially at the input end of the waveguide in a plane perpendicular to probe 64*a* and spaced away from the end of that probe. The resistive card 90 is employed to absorb the reflected field perpendicular to the field launched; i.e. the $TE_{1,1}$ component having a polarization in the plane of the resistive card. To enable a reduction in the diameter of the waveguide 62, the guide is filled with a solid dielectric 92, except for the space between end plugs 78; an air space separates vanes 76 about rod 74 within the waveguide 62.

Input port connector 64 is coupled to a respective output of the 8-way power divider 54 of transmitter 22 (FIG. 7), and each of the output port connectors 66 and 68 are respectively coupled to a pair of diametrically opposite probes of the ring of probes 36. The output power from transmitter 22 causes a linearly polarized wave to be launched into the waveguide from input probe 64*a*. Application of a sinusoidal control current from beam control circuit 26 (FIG. 2) via wires 80*a* and 80*b* thru solenoid 80 produces an axial magnetic field within rod 74, which in turn causes the plane of polarization of the incident wave to be rotated as a function of the strength of the magnetic field. This wave of rotating polarization is converted to an elliptically polarized wave after passing through the quarter wave plate. The orthogonally oriented output probes 66*a* and 68*a* extract conjugately phased outputs from the elliptically polarized wave for application to a diametrically opposite pair of the probes 36.

In an application of this phase shifter at X-band, the control field produced by a 2178 turn solenoid wound in six layers with AWG No. 28 wire enabled ±360° of phase shift to be obtained using a relatively small amount of control power, less than 0.1 watt. The segmented construction of the rod 74 was found to improve the uniformity of distribution of the magnetic field within the rod, and the use of the vanes 76 contributed substantially toward the linearization of rotation with magnetic field strength. When plotting the amount of Faraday rotation produced by this device as a function of magnetic field strength, or coil current, the resulting curve had the form of a magnetic hysteresis loop. The slope of either side of this loop was approximately 10° of rotation per milliampere of coil current. Rotation axis intercepts corresponding to zero applied field occurred at ±20°. Peak applied fields were approximately ±14 ampere turns per inch. The measured insertion loss was less than 1 db. In addition to these electrical advantages, the described phase shifter provided a light package, less than 12 ounces, which was mechanically and electrically rugged.

The source of control signals for the above described phase shifters, namely beam control circuit 26 and pulse source 28, can be implemented in a number of ways, depending upon application requirements. For example, if the antenna system is mounted on a fixed base, a 360° azimuth sweeping beam can be provided by driving a digitally controlled sinewave synthesizer with a fixed pulse rate and using appropriate output phase synthesizing means to provide the desired plurality of phase shifted versions of the synthesized sinewave. If the antenna system is mounted on a body adapted to spin about an axis, and despinning of the radiated pencil beam with respect to the spinning body is required, the source of reference pulses 28 for driving the beam control circuit may comprise a sensor for sighting a selected reference object in the space surrounding the spinning body and generating a pulse in response to each such sighting of the reference object. More specifically, the sensor is located on the spinning body such that a pulse corresponding to the reference object is generated for each rotational cycle of the body, i.e. a pulse is generated for each 360° revolution of the sensor about the spin axis of the body. Hence, the pulse repetition rate from source 28 is equal to the spin rate of the body, and the phase corresponds to the relative position of the reference object. In order to synchronize the rotation of the radiated pencil beam to thereby provide the desired despinning function, the basic synthesized sinewave in the beam control circuit must be synchronized in phase and frequency with the applied reference pulses. To provide this function, the beam control circuit would further include a frequency or phase lock loop responsive to the reference pulses from source 28 for generating timing signals to control the operation of the sinewave synthesizer.

The above general description of the despinning function may be extended to provide an electronically despun antenna system for an earth orbiting, spin stabilized communications satellite, by using the earth as the reference object and using one or more optical or infrared sensors to detect the presence of the earth. The beam control circuit is then operative in response to the generated earth reference pulses to produce a set of periodic waveforms having a frequency equal to the spin rate of the satellite and phased so as to control the block 24 phase shifters to control the energization of probes 36 to form a directional pencil beam which is phase locked to the earth's position. In this manner, the radiated pencil beam is always pointed toward the earth as the satellite spins about its axis. It is to be noted, however, that since the beam control circuit is digitally synchronized, the system also offers the flexible capability of being controlled by command pulses radioed from earth stations in lieu of satellite-derived steering reference signals. Other approaches which can be used to provide the requisite synchronization of antenna beam rotation include the use of a plurality of solar sensors with associated timing circuits and the use of an earth sensor with one or more auxiliary sun sensors.

Figure 15:
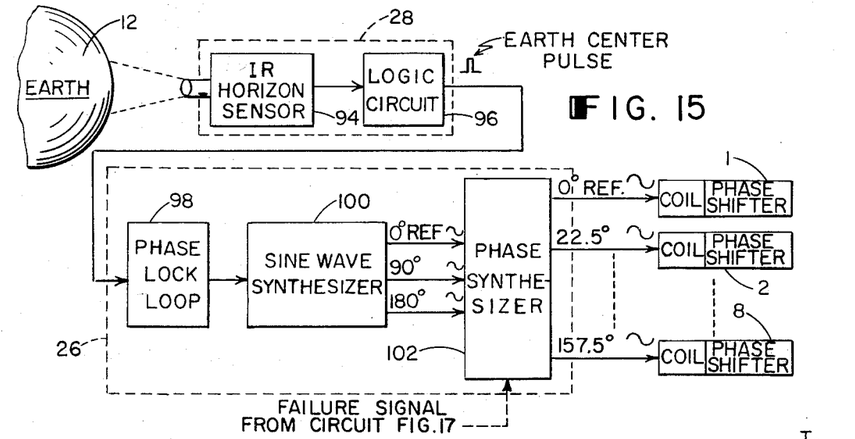
FIG. 15 is a block diagram illustrating a preferred embodiment of the reference pulse source and beam control circuitry which forms a part of the present invention.

A preferred embodiment of the source of control signals for phase shifters 1 thru 8 (FIGURE 7), for use in an electronically despun antenna system mounted on a communication satellite orbiting the earth and spinning about an axis, is shown in FIG. 15. Reference pulse source 28 comprises an infrared horizon sensor 94, which is operative to detect the presence of the earth in its field of view and provide a corresponding output pulse, and a logic circuit 96 for deriving a narrow earth center pulse from the output of the sensor and discriminating against unwanted signals. Beam control circuit 26 comprises a phase lock loop 98 which is responsive to the earth center pulses for generating timing signals synchronized in phase and frequency with the earth center pulses, a sinewave synthesizer 100 driven by the phase lock loop output and operative to provide three sinusoidal output voltages spaced 90° apart in phase, and a phase synthesizer 102 coupled to the output of the sinewave synthesizer for generating a set of eight sinewave control voltages phased 22.5° apart. The eight sinusoidal output signals of phase synthesizer 102 are respectively coupled to the control coils, or solenoids, of phase shifters 1 thru 8.

One infrared sensor found suitable for this application is sensitive to the wavelength region from 7.5 to 20 microns and employed a 1.5″ diameter germanium lens and a thermistor bolometer detector. This type of sensor detects the black body radiation from the earth, which varies from 200° to 300° Kelvin, and is relatively independent of the time of day and amount of sun light. Consequently, as the sensor repeatedly scans the earth pursuant to the spinning of the satellite and the earth enters and exits from the field of view of the sensor, both horizons remain equally well defined at all times, thereby simplifying signal processing. That is, since the earth is warmer than free space, it always presents a contrast to the sensor, which looks alternately at earth and at space. The resulting output is a series of pulses, each of which has a rather distorted rectangular wave shape with the leading edge representing the entrance of the earth into the field of view of the sensor and the trailing edge representing the exit of the earth from the field of view.

Figure 16:
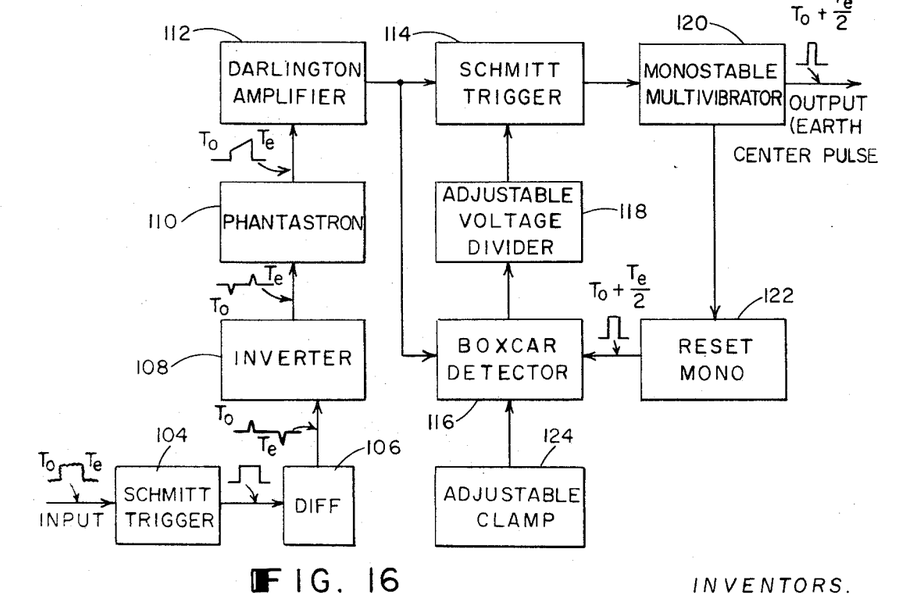
FIG. 16 is a block diagram of a logic circuit useful in the reference pulse source shown in FIG. 15.

A preferred embodiment of the logic circuit 96, which derives the earth center pulses from the sensor output, is shown in FIG. 16. In the waveforms denoted at various points in the block diagram circuit, $T_o$ refers to the time of earth entrance into the field of view of the sensor and $T_e$ represents the time of exit from the field of view. The output pulse from the sensor is applied to a Schmitt trigger 104 for squaring of the leading and trailing edges and then to a differentiator circuit 106. The resulting output of the differentiator is a positive going pulse which represents the entrance of the earth to the field of view of the horizon sensor and a negative going pulse which represents the exit of the earth from the field of view. This differentiated output is applied through an inverter 108 to control the operation of a phantastron ramp generator 110. Each negative going pulse applied to the phantastron is used to start the ramp waveform, and the positive going pulse turns the ramp off. The ramp output of the phantastron is applied to a Darlington amplifier 112 which acts as an impedance transformer in addition to providing amplification. The output of the Darlington amplifier is applied in parallel to a Schmitt trigger circuit 114 and a boxcar detector 116. The boxcar detector preserves the peak voltage to which the ramp rises and applies this voltage level to an adjustable divider 118 for division by two and subsequent application as a second input to Schmitt trigger 114. The two inputs to Schmitt trigger 114 are summed in a manner such that when the amplitude of the pulse from the Darlington amplifier becomes equal to the halved pulse which is derived from the previous pulse to the boxcar detector, the Schmitt trigger fires. This results in generation of a pulse at the middle of the time period between the earth's entrance into and exit from the field of view of the sensor $$T_o + \frac{T_e}{2}$$

The leading edge of the output pulse from Schmitt trigger 114, therefore, identifies the location of the local vertical of the earth. This pulse is then used to trigger a monostable multivibrator 120 which provides the earth center pulse output of desired narrow pulse width for application to the beam control circuit 26. The output of monostable 120 is also used to trigger a monostable 122, the output of which is used to reset the boxcar detector 116, after the earth center pulse has occurred, in preparation for the next pulse. To provide discrimination against unwanted signals which may occur between the earth pulses, such as those due to the sun, the moon and noise, an adjustable clamp circuit 124 is coupled to boxcar detector 116 and adjusted so that any sweep (Darlington amplifier output pulse width) which is less than a selected duration, e.g. 15 milliseconds, will be rejected. That is, the earth center pulse generating circuit is disabled in response to a time period between the entrance and exit indications ($T_e - T_o$) which is shorter than a preselected minimum duration.

Phase lock loop 98 may comprise any of a number of well known designs. The essential circuit elements include a voltage controlled oscillator, a digital phase detector for comparing a feedback signal from the oscillator with the received earth center pulses, and a low pass filter coupled between the phase detector output and a control element of the oscillator. If there is a phase difference between the earth center pulse and the oscillator feedback signal (which may be a divided down version of the actual oscillator frequency), the digital phase detector generates an error signal which is applied via the low pass filter to correct the voltage controlled oscillator phase or frequency so that the feedback signal is in phase or frequency lock with the incoming earth center pulse. If design constraints permit, the voltage controlled oscillator may directly generate a sinewave, in which event the sinusoidal output of phase lock loop 98 could be coupled directly to a phase synthesizer. In the FIG. 15 embodiment, however, due to the relatively low frequency range of the earth center pulses (1 to 3 cycles per second), a sinewave synthesizer is included, with phase lock loop 98 being designed to provide a suitable timing signal for driving the sinewave synthesizer. For example, one conventional approach is to employ a free-running multivibrator as the voltage controlled oscillator in the phase lock loop, the square wave output of this multivibrator being controlled in phase and frequency by varying the voltage source which recharges its timing capacitors. The square wave from the voltage controlled multivibrator is then passed through a pair of digital integrators to obtain reference and quadrature phased, triangular wave timing signals for application to the sine wave synthesizer. Typically, each of the digital integrators comprises an up-down counter which is driven by the square wave and a digital-to-analog converter which changes the digital number present in the up-down counter to an analog voltage. The quadrature phased output is provided by including, in one of the counters, a reset circuit which initially presets the counter in such a way as to provide an output displaced by a sufficient number of counts from the reference counter to result in generation of a triangular wave output which is displaced 90° from the triangular wave reference output.

Sinewave synthesizer 100, in this instance, may comprise a pair of waveform shaping circuits for respectively processing the triangular waveform timing signals to provide a 0° reference sinewave output and a second sinewave output phase shifted 90° from the reference; the 180° phase shifted output can easily be provided by inverting the reference sinewave. The waveform shaping circuits may be of the conventional design, whereby the shunt resistance of a divider network is varied in steps using diodes properly back biased to change the slope of the output wave.

As an alternate approach, sinewave synthesizer 100 may comprise an all digital circuit responsive directly to the square wave pulse train from the phase lock loop voltage controlled multivibrator. A particularly useful digital sinewave synthesizer, which provides advantages of improved accuracy, long term stability, high reliability and low power consumption, is described in a copending application Ser. No. 606,136, filed Dec., 30, 1966 and assigned to the assignee of the present application. Briefly, this synthesizer concept comprises the application of a variable drive rate to a binary counter associated with a digital-to-analog converter. The variable drive rate is responsive to the applied input pulses and programmer controlled to result in generation of the desired waveform from the digital/analog converter.

In phase synthesizer 102, the 0° (reference) and 90° sinewaves are respectively coupled through attenuators and amplifiers to the solenoids of phase shifters 1 and 5 (not shown), the amplifiers being used to provide sufficient power to control the phase shifters. The remaining six outputs are phase synthesized by summing two of the three equal amplitude sinusoidal signals from synthesizer 100. For example, if the 0° and 90° sine waves are summed using a resistance summing network with both resistors equal, the resultant voltage across a load resistor is a sine wave phase shifted 45° from the 0° reference sinewave. In the same manner, with the proper choice of summing resistors, the 22.5° and 67.5° sinewaves are synthesized. To obtain the 112.5°, 135° and 157.5° signals, the 90° and 180° sinewave signals are summed using the proper summing resistance ratio to obtain each of the desired phase shifts. Each of the above mentioned summing networks are followed by an amplifier to provide sufficient control power to the respective phase shifters. As a result of this circuit arrangement, the reference sinewave output of phase synthesizer 102 is frequency locked to the spin rate of the satellite and phase locked to the earth's position, and the other seven outputs are progressively shifted in phase with respect to the reference by 22.5°, 45°, 67.5°, 90°, 112.5°, 135°, and 157.5°, respectively. As previously mentioned, these control signals, upon application to phase shifters 1 thru 8, produce the required relative phase variation of the radio signal applied to the ring of probes 36 in the antenna radiating structure to form the antenna field pattern into a narrow beam, and to cause the field pattern to rotate in a direction counter to the spin of the satellite and at the same angular velocity. This causes the beam to point in a fixed direction, namely, in the direction of the earth.

Since a failure in the control system described above would render the antenna completely useless, the antenna system further includes means for switching to a toroidal omindirectional antenna pattern in response to a failure of the control system. In the preferred embodiment of the despun antenna system, this omnidirectional fail-safe mode of operation is provided by using a failure detection circuit to detect errors in the earth center pulses or phase shifter control signals and generate a corresponding failure signal, by including a center probe 126 in the radiating structure (FIGS. 3 and 4), and by using microwave switch 52 (FIG. 7) to switch the transmitter 50 output power from the ring of probes 36 to center probe 126 in response to the failure signal. Referring to FIGS. 3 and 4, this center probe is disposed coaxially with horn 30 between parallel plates 32 and 34. More particularly, probe 126 is located at the center of the ring of probes along the axis 38 of the biconical horn 30, axis 38 coinciding with the spin axis 16 (FIG. 1) of satellite 10. Upon being energized by the transmitter, central probe 126 radiates an omnidirectional pattern, and both the power divider 54 and phase shifters 1 thru 8 are eliminated from the transmitter to radiating structure coupling circuit.

One factor of concern with this approach is the coupling of the radiation from the central probe to the ring of probes 36. Any power absorbed by the ring of probes is dissipated in the power divider 54 and this causes insertion loss. The amount of coupling from the center probe to the ring is held to an extremely small amount by employing a certain diameter. This is achieved because for a given diameter, the ring of probes becomes anti-resonant to the mode of electromagnetic wave energy radiated by center probe 126. Experimentation has shown this critical diameter to be in the order of 1.8 wavelengths of the transmitting frequency. The coupling between the center probe and a ring 1.8 wavelengths in diameter has been found to be less than 22 db. This ring diameter corresponds to a 22.6° beamwidth, and the total loss of power due to coupling from the center probe to the ring causes less than 0.5 db insertion loss.

Figure 17:
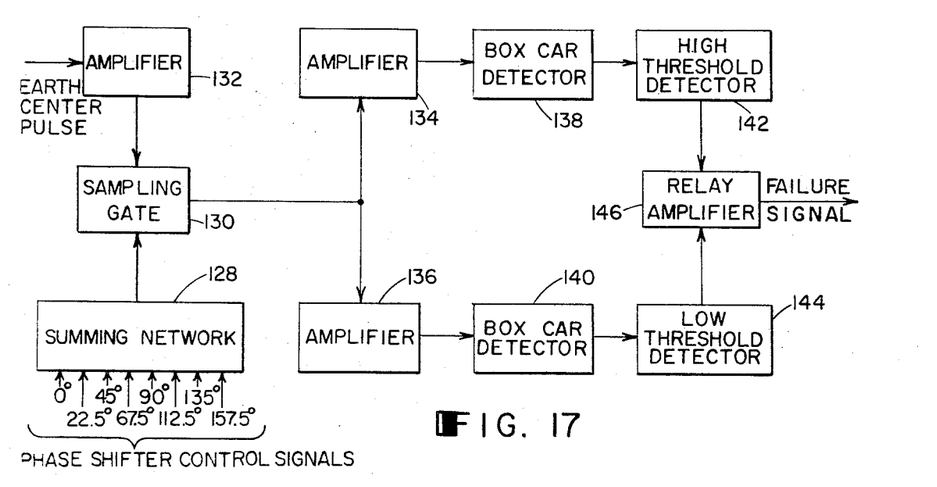
FIG. 17 is a block diagram of a failure detection circuit useful in the antenna system of the present invention.

The failure detection circuit for controlling the omnidirectional fail switch 52 (FIG. 7) is shown in block diagram form in FIG. 17. The eight sinusoidal phase shifter control signals from beam control circuit 26 (FIG. 2) are applied through a current summing network 128 to a sampling gate 130. The other input to the sampling gate is the generated series of earth center pulses which are applied from source 28 (FIG. 2) through an amplifier 132 to the sampling gate. The output of sampling gate 130 is applied in parallel to a pair of amplifiers 134 and 136, the outputs of which are respectively connected to boxcar detectors 138 and 140. The output of boxcar detector 138 is applied to threshold detector 142 which detects amplitude excedences beyond a preselected high limit, and the output of boxcar detector 140 is applied to a threshold detector 144 which detects amplitudes below a preselected low limit. The outputs of threshold detectors 142 and 144 are coupled through an amplifier 146 to provide the failure signal output for controlling the omnidirectional-fail switch 52. In a preferred embodiment, this is implemented by coupling the output of 146 to a relay for controlling the actuation of a microwave switch.

In operation, the failure detection circuit sums the phase shifter control signals and synchronously samples them using the earth center pulse. The boxcar detectors are used to detect the peak amplitude of the sample pulse. The high and low threshold detectors then determine if this pulse is within or outside the preselected amplitude limits. If the level is not within the required tolerance, the pulse amplitude triggers the appropriate threshold detector to generate a failure signal which causes switch 52 to switch the output power of the transmitter from the ring of probes to the center probe. In the preferred embodiment, preselected limits were established such that the pulse amplitude would trigger the threshold detector for the following conditions: (1) an omission in the generated series of earth center pulses; (2) an absence of phase shifter coil current for one or more of the phase shifters; and (3) an incorrect phase relationship of substantial magnitude between any of the eight phase shifter currents and the earth center pulse.

To ensure that a failure indication is not due to a catastrophic circuit malfunction, but rather due to a loss of infrared sensor signal or some other short term affect, the phase shifter control signals are continuously monitored after the failure is detected. This continued monitoring of the phase shifter coil signals is permissible since the microwave power will have been switched to the omnidirectional center probe in the antenna. Since power is of prime importance to satellite operation a timing circuit can then be used to completely shut down the beam control circuit if the failure continues over a period of time.

An alternate method of providing an omnidirectional-fail safe mode is to demagnetize the phase shifters in response to the failure signal so that all phase shifters provide the same phase outputs to the ring of probes. The mode radiated in this case by the biconical horn antenna is a toroidal omnidirectional pattern. This demagnetization can be accomplished by decoupling the control signals from the phase shifters. According to a preferred implementation of this alternate method, means are included in the phase synthesizer 102 (FIG. 15) for clamping the eight control signal outputs to the zero voltage amplitude level in response to the failure signal. Further, in order to counter hysteresis effects which would normally result in a residual magnetization remaining in the phase shifters, the failure signal also actuates a "buzz signal" generator to apply a high frequency high amplitude signal with a decaying envelope to each of the phase shifter coils to "buzz out" the hysteresis effect. More specifically, this is accomplished by using a failure signal actuated switch to superimpose the "buzz signal" on the eight zero voltage outputs of phase synthesizer 102.

Figure 18:
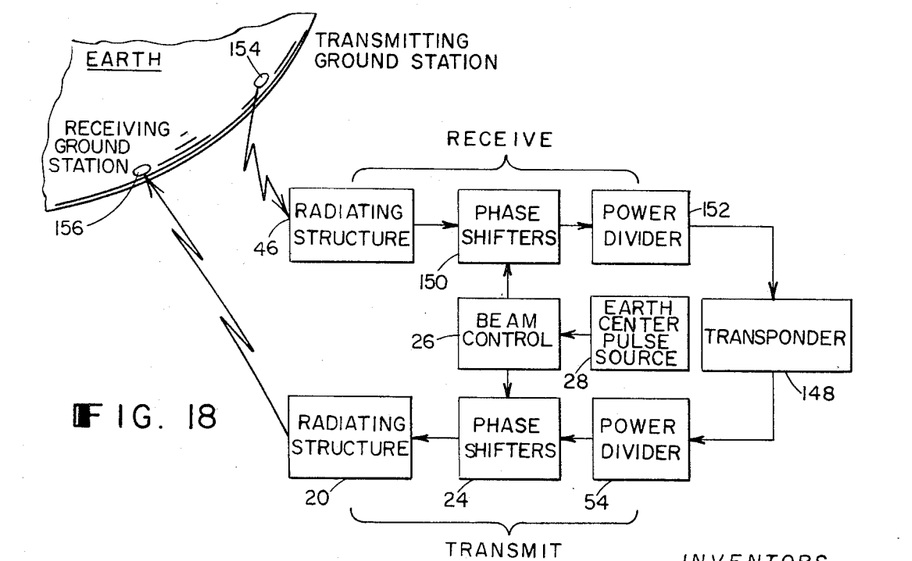
FIG. 18 is a block diagram of a microwave repeater system for use in an earth orbiting communication satellite.

As previously mentioned, earth orbiting communication satellites are normally employed as microwave repeater stations for relaying radio signals between a pair of earth stations located within the area of the earth's surface illuminated by the satellite antenna beam. Hence, the complete despun antenna system for such a satellite would comprise a transponder 148 and receive and transmit beam formation circuitry as illustrated in the block diagram of FIG. 18. The microwave transmitting components include the previously described power divider 54, phase shifters 24 and radiating structure 20, and the microwave receiving components include radiating structure 46, which is juxtaposed with the transmitting antenna as shown in FIG. 4, a separate set of phase shifters 150, and a separate power divider 152 (in this instance functioning as a summing network). Earth center pulse source 28 and a common beam control circuit 26 provide control signals for both receiving and transmitting systems. In operation, a ground station 154 transmits a left hand circularly polarized signal to the satellite which is converted to a linearly polarized mode in the radiating structure 46. The received signal is fed through the probes of the radiating structures, phase shifters 150, and the power divider (summing network) 152 to the transponder. The transponder 158 amplifies the received signal and sends it on through power divider 54 and phase shifters 24 to the transmitting antenna radiating structure 20. The linear polarized mode in radiating structure 20 is converted to a right hand circularly polarized wave and transmitted by means of a high gain pencil beam receiving ground station 156.

Figure 19:
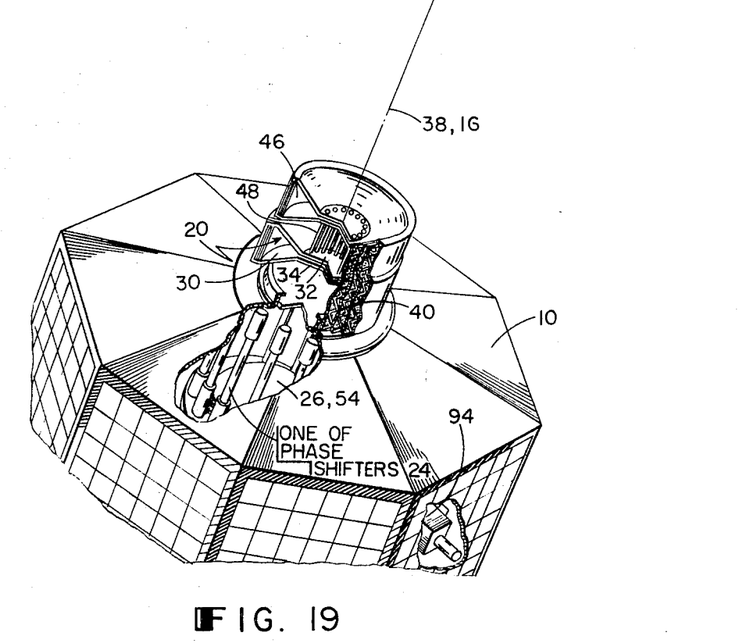
FIG. 19 is a cutaway perspective view of a communications satellite including the electronically despun antenna system of the present invention.

The general mechanical arrangement of the above described communication satellite is illustrated by the simplified cutaway view of FIG. 19. Axis 16 is the spin axis of the satellite 10, and the infrared horizon sensor 94 is mounted on the side of the satellite such that it rotates about spin axis 16 and has an azimuth plane of scan which is perpendicular to that spin axis. The transponder, power divider 54, phase shifters 24 and beam control circuit 26 are mounted within the satellite, and the biconical horn radiating structures 20 and 46 are vertically stacked on top of the satellite. The common axis 38 along which the transmitting and receiving antennas 20 and 46 are juxtaposed is coincident with the spin axis 16. The cutaway view also shows the biconical horn 30 and parallel plates 32 and 34, along with the feed lines 48 to the receiving antenna. FIG. 19 also more clearly illustrates the arrangement of the polarizer 40.

There has been described an improved means for shaping the beam of a 360° azimuth scanning antenna system. In particular, the present invention provides, in the preferred embodiment, an improved electronically controlled despun antenna system for a spin stabilized communication satellite. The advantages include a more efficient, reliable and compact beam forming method, and the inclusion of an omnidirectional-fail safe mode of operation. It will be understood, however, that the invention may be utilized in a spinning body located in environments other than space, and it would also have significant utility in applications such as a radio beacon or in radio direction finding apparatus. Further, although a preferred embodiment of the invention has been described, modifications falling within the scope and spirit of the invention will occur to those skilled in the art. For example, the energization of probes 36 may be controlled by methods other than the cophasal technique described; methods such as varying the power of excitation, sequencing the excitation of the probes, or combinations of power level and phase sequencing may be employed. Also the arrangement of the probes may be other than that described, and other types of microwave components may be included in the parallel plate region in order to modify the beam formation to meet particular requirements. Along with the above, single output phase shifters may be employed in different control arrangements with additional circuit means coupled between the phase shifters and the probes to achieve specific excitation patterns. As previously mentioned, there are a variety of reference pulse sources for triggering the beam control circuit, such as solar sensors, timing circuit, and command pulses. Further, the sensor logic circuit of FIG. 16 and the failure detection circuit of FIG. 17 may be implemented in other ways. It is intended, therefore, that the invention not be limited to what has been specifically illustrated and described, except as such limitations appear in the appended claims.

What is claimed is:

1. An antenna system comprising, in combination, a flared biconical horn, a pair of parallel plates inwardly terminating said horn and providing a radial transmission line feed for said horn, a ring of probes disposed between said pair of parallel plates, a radio transmitter having signal output means coupled to said probes for energizing said ring of probes to excite a mode of electromagnetic wave energy between said pair of parallel plates, said wave energy having an electric vector perpendicular to said parallel plates and radiating into said horn, means for controlling the energization of said probes which is adapted to vary the phase of the output signals of said transmitter which are applied to said probes, and a polarizer of the anisotropic dielectric type disposed around the periphery of said horn for converting said wave energy into circular polarization.

2. An antenna system in accordance with claim 1 wherein said polarizer comprises a plurality of concentric cylindrical gratings spaced apart to provide an impedance match for said wave energy between said horn and free space.

3. An antenna system in accordance with claim 1 further including a second flared biconical horn juxtaposed with said first mentioned horn, along a common axis, a second pair of parallel plates inwardly terminating said second horn and providing a radial transmission line feed for said second horn, a second ring of probes disposed between said second pair of parallel plates, a radio receiver having an input, means coupling said second ring of probes to the input of said receiver, and a second polarizer of the anisotropic dielectric type disposed around the periphery of said second horn for converting received circularly polarized electromagnetic wave energy into wave energy having an electric vector perpendicular to said second pair of parallel plates, the polarization of the received wave energy being of opposite sense to the polarization of the wave energy transmitted from said antenna system.

4. An antenna system comprising, in combination, a flared biconical horn, a pair of parallel plates inwardly terminating said horn and providing a radial transmission line feed for said horn, a ring of probes disposed symmetrically about the axis of said horn between said parallel plates, a radio transmitter having a power output terminal coupled to said ring of probes for energizing said ring of probes to excite a mode of electromagnetic wave energy between said pair of parallel plates, means for controlling the energization of said probes, a center probe disposed coaxially with said horn between said pair of parallel plates, and means for switching the output power of said transmitter from said ring of probes to said center probe in response to failure of said control means.

5. An antenna system comprising, in combination, a flared biconical horn, a pair of parallel plates inwardly terminating said horn and providing a radial transmission line feed for said horn, a ring of probes disposed between said pair of parallel plates, a radio transmitter having power output means for energizing said ring of probes to excite a mode of electromagnetic wave energy between said pair of parallel plates, and means including a plurality of controllable phase shifters for controlling the energization of said probes, each of said phase shifters being a waveguide assembly comprising a Faraday rotator, an input port for coupling applied electromagnetic wave energy to said Faraday rotator, a dual mode transducer including a pair of output ports, and a ninety degree differential phase shift section disposed between said rotator and said transducer, said input port being coupled to the power output means of said transmitter and each of said transducer output ports being coupled to a respective one of said probes.

6. An antenna system in accordance with claim 5 wherein said Faraday rotator comprises a ferrimagnetic rod coaxially positioned within said waveguide assembly and a solenoid arranged to produce an axial magnetic field within said rod when electrically energized, said ninety degree differential phase shift section is a quarter wave plate having fast and slow planes of propagation, and said dual mode transducer is oriented with respect to said quarter wave plate so as to extract separately via said transducer output ports the two orthogonal polarizations of any plane polarized wave propagating through said waveguide assembly which are inclined ±45 degrees to the fast plane of said quarter wave plate.

7. An antenna system comprising, in combination, a flared biconical horn, a pair of parallel plates inwardly terminating said horn and providing a radial transmission line feed for said horn, a ring of probes disposed between said pair of parallel plates, a radio transmitter having power output means for energizing said ring of probes to excite a mode of electromagnetic wave energy between said pair of parallel plates, and means for controlling the energization of said probes including a plurality of controllable phase shifters coupled between the power output means of said transmitter and said ring of probes, a source of reference pulses and means responsive to said reference pulses for producing a plurality of periodic waveforms, each of which has a distinct phase offset with respect to the others and all of which are applied as control signals to said phase shifters.

8. An antenna system in accordance with claim 7 further including switching means for decoupling said periodic waveform control signals from said phase shifters in response to an error in said reference pulses or an error in said periodic waveform control signals.

9. An antenna system in accordance with claim 7 wherein said ring of probes is disposed symmetrically about the axis of said horn, and further including a center probe disposed coaxially with said horn between said pair of parallel plates, failure detection means for generating a failure signal in response to an error in said reference pulses or an error in the control signals applied to said phase shifters, and means for switching the output power of said transmitter from said ring of probes to said center probe in response to said failure signal.

10. An antenna system in accordance with claim 9 wherein said failure detection means comprises means for summing the control signals applied to said phase shifters, means for synchronously sampling the output of said summing means in response to said reference pulses to thereby generate sample pulses, means for detecting the amplitude of said sample pulses, and means for generating a failure signal when the amplitude of said sample pulses is outside a preselected limit.

11. An antenna system in accordance with claim 7 wherein said means for producing a plurality of periodic waveforms comprises a phase lock loop responsive to said reference pulses for generating timing signals synchronized in phase and frequency with said reference pulses, means for synthesizing a sinewave in response to the timing signals from said phase lock loop, and means coupled to said sinewave synthesizer for producing a plurality of phase shifted versions of said synthesized sinewave.

12. An antenna system in accordance with claim 7 wherein said system is mounted on a body adapted to spin about an axis, the axis of said horn is coincident with said spin axis, said source of reference pulses comprises means for detecting a selected reference object in the space about said body and for generating a pulse corresponding to said reference object, a series of said reference object pulses thereby being generated when said body is spinning, and said means for providing a plurality of periodic waveforms is operative in response to said reference object pulses to generate periodic waveforms having a frequency equal to the spin rate of said body and phased so as to control said phase shifters to control the energization of said probes to form a directional beam from said horn which is despun with respect to said spinning body and phase locked to the position of said reference object.

13. An antenna system in accordance with claim 12 wherein said ring of probes is disposed symmetrically about said spin axis, each of said phase shifters includes a ferrite element and means for magnetizing said ferrite in response to periodic waveform control signals applied thereto, the amount of phase shift being a function of the strength of magnetization, and further including failure detection means for generating a failure signal in response to an omission in said generated series of reference object pulses or an error in the control signals applied to said phase shifters, and means for demagnetizing said ferrite phase shifters in response to said failure signal to thereby provide in-phase energization of said probes and cause a toroidal omnidirectional pattern to be radiated from said horn.

14. An antenna system in accordance with claim 13 wherein said failure detection means comprises means for summing the control signals applied to said phase shifters, means for synchronously sampling the output of said summing means in response to said generated series of reference object pulses to thereby generate sample pulses, means for detecting the amplitude of said sample pulses, and means for generating a failure signal when the amplitude of said sample pulses is outside a preselected limit.

15. An antenna system in accordance with claim 12 wherein said ring of probes is disposed symmetrically about said spin axis, and further including a center probe disposed between said pair of parallel plates coincident with said spin axis, failure detection means for generating a failure signal in response to an omission in said generated series of reference object pulses or an error in the control signals applied to said phase shifters, and means for switching the output power of said transmitter from said ring of probes to said center probe in response to said failure signal to thereby cause a toroidal omnidirectional pattern to be radiated from said horn.

16. An antenna system in accordance with claim 15 wherein the diameter of said ring of probes is selected to be of the order of 1.8 wavelengths of the transmitting frequency of said system so that said ring of system is anti-resonant to the mode of electromagnetic wave energy radiated by said center probe.

17. An antenna system in accordance with claim 16 wherein each of said controllable phase shifters couples two diametrically opposite probes of said ring of probes to the power output means of said transmitter, the width of the beam radiated from said horn in the plane normal to the axis of said horn is directly proportional to the diameter of said ring of probes, and the width of the beam radiated from said horn in the plane in which said horn axis lies is inversely dependent on the aperture width of the mouth of said horn.

18. An antenna system in accordance with claim 7 wherein said system is mounted on a communication satellite orbiting the earth and spinning about an axis, the axis of said horn is coincident with said spin axis, said source of reference pulses comprises a sensor for detecting the presence of the earth and a logic circuit for deriving a narrow earth center pulse from the output of said sensor and discriminating against unwanted signals, a series of said earth center pulses thereby being generated due to the spinning of said earth orbiting satellite, and said means for providing a plurality of periodic waveforms is operative in response to said earth center pulses to generate periodic waveforms having a frequency equal to the spin rate of said satellite and phased so as to control said phase shifters to control the energization of said probes to form a directional beam from said horn which is despun with respect to said spinning satellite and phased locked to the earth's position.

19. An antenna system in accordance with claim 18 wherein said sensor is an infrared sensor and said logic circuit comprises means for indicating both the earth's entrance into and exit from the field of view of said sensor, means responsive to said entrance and exit indications for generating a pulse at the middle of the time period between the earth's entrance into and exit from the field of view of said sensor, and means for disabling said last-mentioned pulse generating means in response to a time period between said entrance and exit indications which is shorter than a preselected minimum duration.

References Cited
UNITED STATES PATENTS

| | | | |
|---|---|---|---|
| 3,090,956 | 5/1963 | Woodward et al. | 343—100 |
| 3,133,282 | 5/1964 | Rosen | 343—100 |
| 3,182,326 | 5/1965 | Cutler | 343—100 |
| 3,341,151 | 9/1967 | Kampinsky | 343—100 X |

RODNEY D. BENNETT, *Primary Examiner.*

T. H. TUBBESING, *Assistant Examiner.*

U.S. Cl. X.R.

343—756, 854